Oct. 27, 1964 E. O. CARLTON 3,153,870

DATA HANDLING SYSTEM

Filed June 23, 1961 3 Sheets-Sheet 1

EDWARD O. CARLTON

*INVENTOR.*

BY Stanley Belsky

ATTORNEY.

Oct. 27, 1964 E. O. CARLTON 3,153,870

DATA HANDLING SYSTEM

Filed June 23, 1961 3 Sheets-Sheet 2

EDWARD O. CARLTON
*INVENTOR.*

*BY* Stanley Belsky
ATTORNEY.

EDWARD O. CARLTON
*INVENTOR.*

*BY* Stanley Belsky
ATTORNEY.

3,153,870

DATA HANDLING SYSTEM

Edward O. Carlton, Indialantic, Fla., assignor to Itek Corporation, Lexington, Mass., a corporation of Delaware Filed June 23, 1961, Ser. No. 119,213
17 Claims. (Cl. 40—79)

The present invention relates generally to the art of data handling. More particularly, the invention relates to the handling of graphic data bearing media. More especially, the invention relates to systems, methods and devices for selecting, retrieving, storing, viewing and reproducing graphic data media.

The term "medium," as used in the expression "data bearing medium" herein, is limited to a structure which is relatively thin and primarily extends along two dimensions; hence, it is planar, i.e., like a plane. Examples of such structures include, but are not limited to, sheets of paper or film. The term "media," as used herein, is the plural form of medium as defined above. The term "data," as used in the expression "data bearing medium" herein, is limited to information codings per se. Examples of such information codings include, but are not limited to, graphic impressions produced, e.g., by printing, marking, photographing, thermographing, and electrographing. The expression "data bearing medium," as used herein, is limited to a structure, or medium as defined above, bearing information codings, or data as defined above, and excludes supporting structures such as drawers, boxes, cabinets and other like containers.

While the invention is subject to a wide range of applications, it is especially suited for use in a system where the data bearing media are in the form of "chips" of microfilm derived from photographing stored documents. This invention is directed to the solution of problems concerned with the economic handling of relatively large quantities of individual documents. The problem becomes particularly acute in those applications where there is relatively infrequent use of a large number of individual but similar documents.

The problem is further aggravated by the requirement of maintaining records in up-to-date correlation with a prime document. Hospital records for individual patients present a typical example. The patient's record may include serological reports, X-ray, diagnosis and prognosis reports, etc. His record must be open for receiving new materials. These records must be readily accessible even though the record of a given individidual may be required only infrequently. In the case of title insurance companies, document control in chronological order is required with regard to a particular real estate. Such documents must be stored for long periods and maintained completely up-to-date with regard to any new transactions affecting the property. It will be apparent from the examples noted above that the requirement for storage space increases rapidly with time. A need for a storage mechanism which can handle a high density of information with ready accessibility is clear.

In the prior art, a solution for these problems has been provided in the form of well-known microfilming techniques. There the documents are photographed and stored in rolls of microfilm. In order to find a particular document or image, the roll must be unwound and viewed image for image until the desired image is found. To bring the file up to date or to introduce new matter, it is necessary to cut the film roll and splice into it a new film strip. In accordance with such prior art methods, there is no ability of random access. It is expensive and complicated to bring files up to date and to add new material.

More recently there has been a development involving the use of discrete microphotographing of single documents mounted on cards. Each card may carry a large number of microphotographs and can be coded for identification purposes to enhance the capability for rapid searching. The use of such discrete data bearing media greatly enhances the capability for random access. With such discrete media, new material may be filed and the files brought up to date with much greater facility. A particular need has developed for placing a data bearing medium in its proper order within a given grouping. The use of cards for carrying microphotographs simply adds bulk and reduces the information density which can be realized.

The solution to these and other problems is provided in accordance with the present invention by microphotographing the document. The photographs are cut in uniform, discrete media. Each medium has a uniform numebr of microphotographs. The media are then stored in a magazine. When a particular microphotograph is required, the magazine is removed from its rack or storage bin and inserted into a device for rapidly selecting and retrieving a desired microphotograph. The position of the magazine may be adjusted with respect to the plane of an elongated belt. The belt is driven to move a desired medium out of the magazine and provide the desired microphotograph or chip in a preselected position. After the chip has been retrieved or viewed, the drive may be reversed and the medium restored to its proper position in the magazine.

Documents 8½" x 11" in dimension may be proportionally reduced by microphotography to approximately 1/35 of normal size. Thus, five documents may be stored on a single data bearing medium 16 mm. wide and 1¾" long. In a magazine occupying less than 1 cu. in., more than 30 such media and 150 microphotographs may be accommodated. It thus becomes economical to record an entire document on a given medium. Related documents may be filed in close relation by recording them on other media. In this manner, random access is greatly facilitated. The process of adding new materials and up-dating the old materials for serial ordering is considerably enhanced. Furthermore, the space requirements are substantially reduced.

It is therefore an object of the invention to provide an improved data handling system exhibiting random access.

Another object of the invention is to provide an improved data handling system facilitating rapid selection and retrieval of a desired data bearing medium.

Still another object of the invention is to provide an improved data handling system exhibiting greater facility for adding new material and up-dating old material.

Yet another object of the invention is to provide an improved data handling system exhibiting a high degree of data storage density.

A still further object of the invention is to provide an improved data handling system requiring a minimum of storage space.

Still a further object of the invention is to provide an improved data handling system compatible with manual control.

Yet another object of the invention is to provide an improved data handling system of compact and light-weight structure exhibiting economy of manufacture and ease of operation.

In accordance with the invention, there is provided a data handling system for planar data bearing media. The system comprises a support base means which includes a plane-defining elongated track formed in the base. The track is interrupted along its length for receiving a storage magazine containing the media. Indexing carrier storage means are coupled to the base means and track. The carrier means are attached to receive and carry a storage mechanism for storing a stack of media in parallel, spaced relation. The magazine has openings at its opposite ends to expose pairs of opposed edges of a selected medium. The carrier means further includes means for moving the magazine normal to the plane. A selector means is included in the carrier means for selecting a desired medium in alignment with the plane in accordance with a predetermined index. Transport means are coupled to the base track and carrier means. The transport means includes an elongated, flexible, interrupted looped belt slidably coupled to the track with its ends juxtaposed for engagement with the exposed, opposed edges of a selected medium for moving the medium along the plane. Reciprocal drive means are coupled to the transport means for driving the belt along the track in engagement with selected media for reciprocally moving the medium to and from a preselected position.

For a better understanding of the invention, together with other and further examples thereof, reference is made to the following description taken in connection with the accompanying drawings, and its scope will be pointed out in the appended claims.

*Description of the Invention*

The data handling system broadly operates to move a selected medium reciprocally from a storage magazine to a preselected position. The data presented at the preselected position may be viewed, enlarged, scanned, reproduced, extracted or otherwise used. The medium is moved by the motion of a flexible belt which travels along a plane-defining track. The end of the belt engages an end of the medium to move it in the same direction to the preselected position. Reciprocal action is obtained by reversing the motion of the belt to engage the other end of the medium and move it in opposition to the original direction.

The magazine is formed with spaced, parallel grooves in its side walls to support a plurality of planar data bearing media in parallel, spaced relation. Openings at the opposite ends of the magazine expose the pairs of parallel, opposed edges of the media. The magazine is inserted in a carrier means in a series with a plane defining track. The motion of the magazine is adjustable normal to the plane. The position of the magazine is adjusted with respect to the plane until a desired medium is aligned with the flexible belt which moves along the track. The flexible belt is slidably coupled to the support means in the plane of the track. The ends of the belt are juxtaposed to engage the exposed edges or ends of a selected medium. The belt is driven, for example, by a sprocket wheel and captures a selected medium between its ends. Motion of the belt moves the medium to and from a preselected position. After driving the medium from the magazine to the preselected position, the belt drive may be reversed to return the medium to the magazine.

For use in the present data handling system, documents are photographed on long microfilm strips. In this manner, for example, 1300 documents of 8½" x 11" dimension may be stored on a 50 ft. strip of 16 mm. film. The photographs are uniformly spaced from each other and from the longitudinal edges of the film strip. The strip is separated into uniform lengths whereby each segment carries a selected number of photographs. The segments are referred to herein as "film chips" or "chips."

*Description and Explanation of the Data Handling System in FIGS. 1–16*

Figure 1:
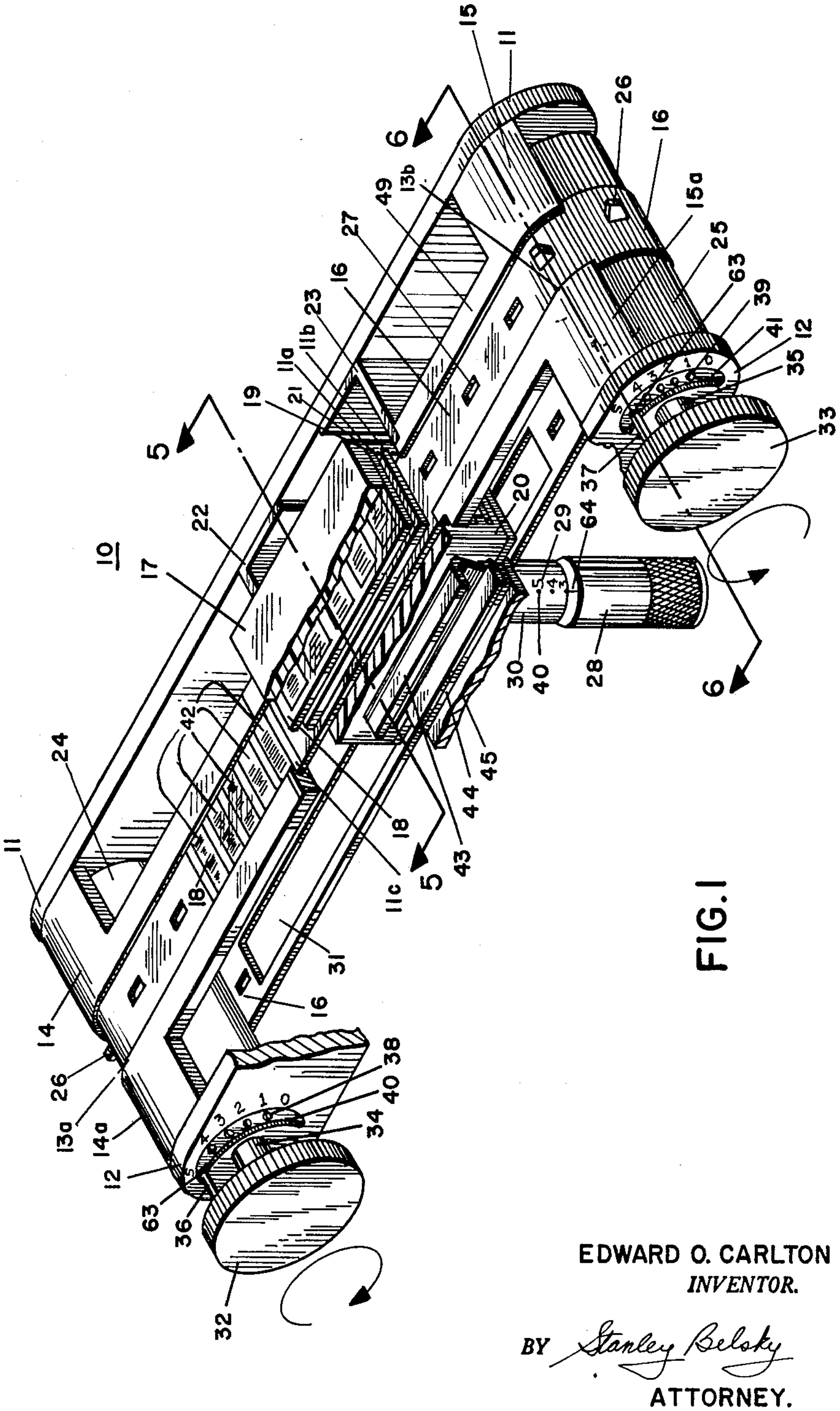
FIG. 1 is a partially cut away, isometric view of a data handling system embodying the invention.

Referring now to the drawings and with particular reference to FIG. 1, there is here illustrated a data handling system embodying the invention. The system generally includes a supporting base having an elongated plane-defining track formed therein along its length. A carrier for a storage magazine of media is coupled to the base in series with the track. The carrier is adapted to receive a magazine carrying a plurality of planar graphic data bearing media disposed in spaced, parallel relation. The carrier supports and moves the magazine normal to the plane of the track for aligning a selected medium along the track plane. The carrier includes a micrometer screw-type selector which is indexed in screw position corresponding with the relative location of the media in the magazine.

To transport a medium or chip, an elongated, flexible belt is coupled to the base track and carrier. The belt is discontinuous and loop-shaped and is driven reciprocally by a pair of oppositely disposed, sprocketed drive rollers along the track. The sprockets engage apertures in the belt. The belt is held in tension looped around the drive rollers. The belt has an elongated opening to provide clearance for the micrometer screw which extends through the belt opening in engagement with the magazine. The micrometer screw is coupled to the carrier and base.

Referring now to FIG. 1, the preferred embodiment of the data handling system of the invention is generally indicated at 10. The support base is provided by a pair of side panels 11 and 12 coupled to base panels 14, **14*a*, 15 and 15*a*. A track channel 13 is provided by channels along the adjacent edges of the base panels to receive a transport belt as shown particularly in FIG. 6 below. The track channel 13 defines a plane along which a discontinuous, loop-shaped belt 16** moves.

A storage magazine 17 carries a plurality of planar graphic data bearing media 18. The magazine 17 generally has the shape of a rectangular tube with a pair of oppositely disposed openings exposing the opposite edges of the media 18. A plurality of pairs of oppositely disposed grooves 19 are formed in parallel spaced relation in a pair of oppositely disposed walls 20 and 21 of the magazine 17. The magazine is coupled to the base by a pair of carrier support members 22 and 23, descibed in greater detail below with reference to FIG. 5. The belt 16 is looped about a pair of oppositely disposed drive rollers 24 and 25. The rollers 24 and 25 have affixed thereto a plurality of sprockets 26 which engage linearly disposed, spaced apertures 27 formed in the belt 16. A micrometer screw selector 28 is indexed, as shown, by the markings 29 on the stem 30 and the reference line 64 on the barrel of the selector 28 in correspondence with the relative positions of the media in the magazine 17. The belt 16 has an opening 31 longitudinally formed therein in the under portions of the belt as shown to provide clearance for the selector 28. The rollers 24 and 25 are driven by a pair of knobs 32 and 33, respectively. The knobs 32 and 33 are affixed to a pair of axle rods 34 and 35 which in turn are affixed to the rollers 24 and 25, respectively. Discriminator members 36 and 37 are affixed to the knobs 32 and 33 respectively for engagement with indents 38 and 39 circumferentially disposed about the axles 34 and 35 in arcuate grooves 40 and 41 formed in the panel 12. As shown here, a medium 18 is in a preselected position for viewing or other further handling. The medium 18 carries a plurality of data groupings 42, such as, for example, photographs of individual pages of a document.

The belt is loop-shaped and interrupted along its length with its ends juxtaposed to provide a space to receive the magazine and engage a selected medium 18. As shown in FIG. 1, the belt has been moved into a position to transport a selected medium 18 into a preselected position for viewing. To remove the magazine in the figure, it is necessary to restore the belt to the position clearing the magazine. The magazine is inserted and held in place by a resilient means such as the spring clip 43. The magazine is supported by a movable carrier plate 44 within the loop of the belt 16. The spring 43 is affixed to the plate 44 to hold the magazine in place in combination with a similar spring clip on the other side.

Figures 2, 3:
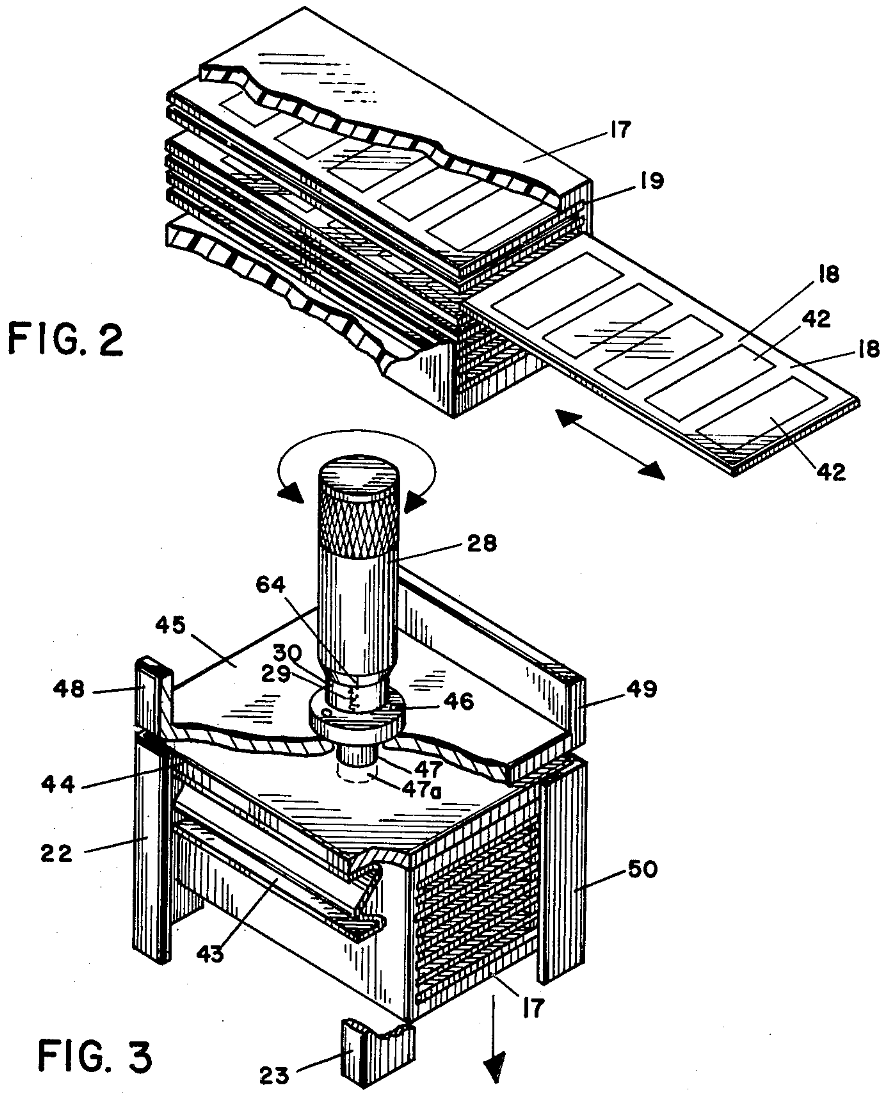
FIG. 2 is an enlarged, cut-away, isometric view of a data bearing media storage magazine in the system of FIG. 1.
FIG. 3 is an enlarged, cut away, isometric view of an indexing device in the system of FIG. 1.

Referring now to FIG. 2, the magazine 17 and a plurality of chips 18 are particularly illustrated. The walls of the magazine are coextensive with the length of a chip. Grooves 19 are formed in the walls to carry the chips in parallel, spaced relation as shown. A given chip 18 carries a plurality of discrete data groupings or photographs 42. The motion of the chip as indicated by the double-headed arrow is reciprocal along the parallel grooves.

Referring now to FIG. 3, the indexing carrier storage means is particularly illustrated. Here the carrier means is upside down, or reversed rotated 180° to show the under side of the carrier structure more clearly. The micrometer screw selector barrel 28 is coupled to stem 30 having indexing marks 29 indicated thereon. The stem 30 is affixed to a flange 46 which is in turn affixed to a carrier support plate 45. A journal rod 47 affixed to the barrel 28 extends into a clearance hole 47*a* in the movable carrier support plate 44. Side members 48 and 49 are attached to the plate 45 for connection to the side panels 11 and 12, respectively. Motion of the screw in the direction indicated by the rotary arrow tends to move the magazine up and down as shown.

Figure 4:
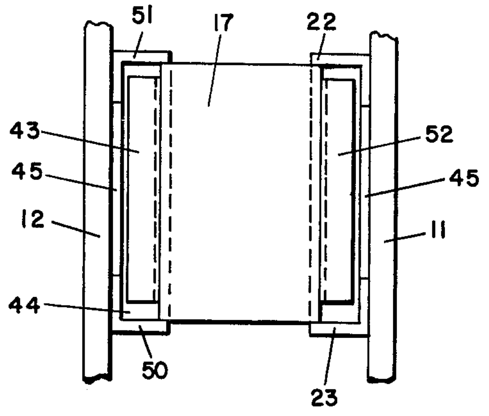
FIG. 4 is a fragmentary, plan view of magazine and carrier in the system of FIG. 1.

In the plan view of FIG. 4, the assembly of the carrier means to the support base is illustrated. This view is taken by looking down on the carrier support means with the magazine 17 in place. The plate 45 is affixed to four right angle guide rails 22, 23, 50 and 51. The spring 43 and a spring 52 apply opposing forces to hold the magazine in place. The springs 43 and 52 are affixed to the carrier support plate 44 which moves with the magazine. The guide rails 22, 23, 50 and 51 provide guides for the plate 44 while permitting its motion along an axis perpendicular to the plane of the drawing. The rails 22, 23, 50 and 51 are affixed to the panels 11 and 12, respectively.

Figure 5:
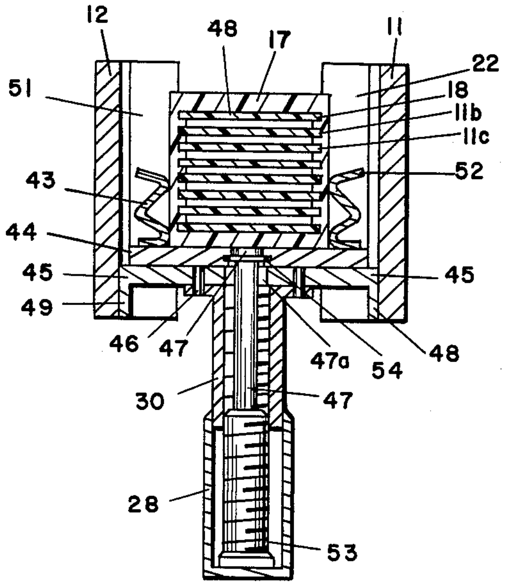
FIG. 5 is a sectional view of the system in FIG. 1 taken along the lines 5—5.

Referring now to FIG. 5, the sectional view exposes the magazine carrier and micrometer selector screw assembly. The micrometer screw selector barrel 28 is affixed to a spindle 53 which is in turn affixed to the rod 47. The rod 47 has a groove formed in it around which a retaining-ring 54 is fixed in place. The retaining ring is held in place in a groove formed in the plate 44. The retainer rod 47 rotates within the groove or channel within the plate 44. Rotation of the selector barrel 28 produces rotation of the spindle 53 affixed to the barrel 28. The outside surface of the spindle 53 and the inside surface of the stem 30 are threaded to provide a threaded screw type engagement therebetween. Rotation of the barrel 28 in a clockwise direction causes the rod 47 to advance upwardly as shown and move the plate 44 and magazine 17 upwardly along the guide rails 22 and 51.

The rod 47 extends into the aperture in the carrier support plate 45. The flange 46 at the end of the stem 30 is mounted on the plate 45 with, e.g., press fit pins inserted in mounting holes in the flange and plate. The stem 30 is affixed to the plate 45 which in turn is attached to the side panels 11 and 12 of the supporting base. The spring retainer clips 43 and 52 are mounted on the movable carrier plate 44, as shown. The selector barrel 28, the spindle 53, the rod 47 and the stem 30 are all concentrically mounted.

Figure 6:
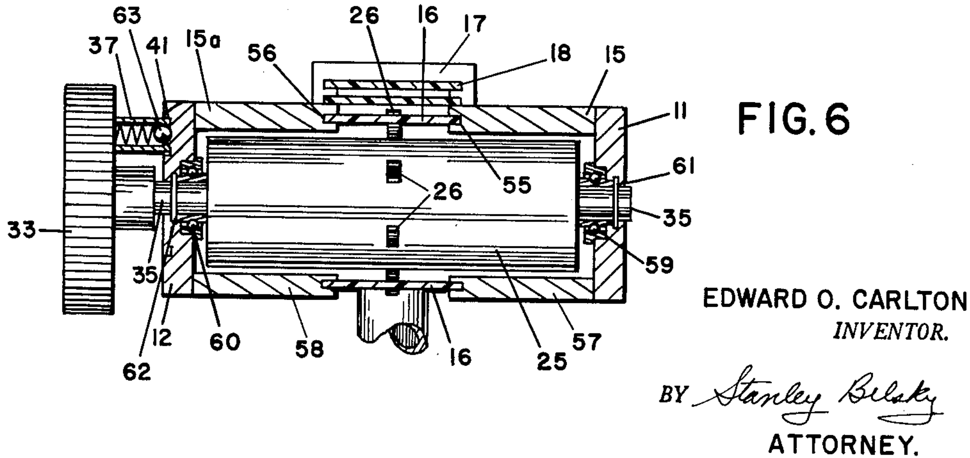
FIG. 6 is a sectional view of the system in FIG. 1 taken along the lines 6—6.

Referring now to FIG. 6, there is here illustrated the drive roller 25 assembly. The roller 24 assembly is substantially identical. The rotatable knob 33 is mounted on an axle 35 which carries the drive roller 25. Attached to the drive roller circumferentially are a plurality of sprockets 26. The sprockets engage apertures in the belt 16 which is carried along the grooves 55 and 56 formed in the support base members 15 and 15*a*, respectively. The grooves 55 and 56 define a plane for a track for the belt 16. The support base members 15 and 15*a* and the members 57 and 58 are affixed to the support base side panels 11 and 12 respectively. The members 57 and 58 are similarly grooved to support the drive belt 16. Axle 35 is supported at its opposite ends by a pair of roller bearings 59 and 60 which are press fitted into suitable support channels formed in the panels 11 and 12. A pair of retaining rings 61 and 62 are affixed to the axle 35 at its opposite ends and supported in grooves formed in the side panels 11 and 12 to restrict the axial motion of the axle 35. The indexing discriminator shaft 37 is hollow and includes a retractable ball bearing 63 which is resiliently mounted within the shaft. The groove 41 is limited in arcuate length which limits the rotatable motion of the knob 33. Indents along the groove correspond with the positions of individual photographs carried by a medium. The indents are shaped to receive the ball 63.

*Operation*

Referring to FIG. 1, the magazine 17 is loaded with a plurality of stacked data bearing media 18 disposed in parallel, spaced relation in the grooves 19. The magazine is inserted in engagement with the spring clips 43 and 52 in such a manner as to firmly mount the magazine on the movable carrier plate 4. Rotation of the barrel of the selector 28 causes the rod 47, FIG. 5, to advance in engagement with the movable plate 44. Motion of the movable plate 44 upwardly as shown carries with it the magazine 17. This motion is continued until a selected chip is aligned with the end of the transport belt 16. When the magazine is inserted, the ends of the belt 16 are so disposed to provide clearance to receive the magazine.

The indication of the correct position of a desired chip is provided by the reference markings 29 on the outside surface of the stem 30 of the selector 28. The barrel of the selector 28 is chamfered and carries a reference line 64 which is aligned for indexing purposes. The reference numerals along the stem 30 provide an index corresponding with the vertical positions of the media 18 relative to the magazine 17. The selected medium is aligned with the track 13. The belt 16 moves along the track with its ends abutting the edges of the media. The belt thus engages the medium for motion along the track. The belt thickness is preferably equal that of a chip, e.g., 1–10 thousandths of an inch.

Rotation of the knob 33 to an extreme position in the counterclockwise position as shown, advances the belt to the left to place the medium in a preselected position for viewing or other purposes. At the same time the belt is in engagement with sprockets 26 affixed to the drive roller 24 driving it in the same direction. Clockwise rotation of the knob 32 reverses the direction of motion of the belt 16. The extreme clockwise position corresponds with the return of the medium to its original position in the magazine.

When the knobs 32 and 33 are in the extreme right position the magazine may be removed. The belt 16 has an opening 31 which clears the selector 28. This enables maximum displacement in either direction of the given medium 18. The opening 31 also provides clearance for the insertion of a light source or viewing device for viewing the individual data groupings or photographs while in position in the track.

The magazines may be carried in storage bins or racks which are stored in larger bins or racks on a permanent basis. The system lends itself to automatic handling by providing the storage bins in a form compatible with automatic conveyance. The data handling system as described above is particularly useful for manual handling of data bearing media. An automatic system of this character may be provided by using servo controls in the place of the manual knobs 32 and 33 and the selector 28. A mechanism for insertion and extraction of the magazine automatically is well within the capability of the art. In an automatic system the desired data media, and even a desired grouping of data within the media may be preselected and programmed into the system.

This provides specific random access to any given grouping of data without the necessity of unwinding a cumbersome roll of microfilm.

The data handling system of the present invention has broad application in the handling of graphic files for industrial and commercial purposes. From the above description, it will be apparent that the present system has a high storage density capability. The magazines are easily handled and capable of storing a large amount of data. The magazine themselves may be stored in racks which in turn may be stored in storage bins to carry or store an enormous amount of data.

The data is provided in a form permitting ready access and compatible with manual operation. The use of the present system for the automatic handling of data bearing media is quite consistent with the manual operation of the device. It will be apparent, that with slight modification the device may be automated, e.g.—use of push button controls, and the attachment of a controllable drive to the manual controls. The full power of data handling system of the present invention becomes apparent when one realizes that the thickness of a typical film chip is under 0.010 of an inch. The spacing between the chips can be less than 0.010 of an inch without sacrificing the selection and retrival capability of the system.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A data handling system for planar data bearing media, comprising:

a support base means, including a plane-defining elongated track coupled to said base, said track being interrupted along its length;

a storage magazine adapted to store said media;

indexing carrier storage means coupled to said base means and track and adapted to receive and carry said storage magazine for storing a stack of said media in parallel, spaced relation, said magazine having openings at its opposite ends to expose pairs of opposed edges of said media, said opening each defining a plane, said plane being at right angles to said length of said track, said carrier means including means for moving said magazine normal to said plane and a selector means for selecting a desired medium in alignment with said plane in accordance with a predetermined index;

transport means coupled to said base track and carrier means and including an elongated, flexible, planar looped belt slidably coupled to said track with its ends juxtaposed for engagement with the exposed, opposed edges of a selected medium for moving said medium along said plane; and reciprocal drive means coupled to said transport means for driving said belt along said track in engagement with a selected medium for reciprocally moving said medium to and from said magazine to a preselected position.

2. A data handling system, comprising:

a plurality of parallel data bearing media;

a support base means, including a plane defining elongated track coupled to said base, said track being interrupted along its length;

a storage magazine adapted to store said media;

indexing carrier storage means coupled to said base means and track and adapted to receive and carry said storage magazine for storing a stack of said media in parallel, spaced relation, said magazine having openings at its opposite ends to expose pairs of opposed edges of said media, said openings each defining a plane, said plane being at right angles to said length of said track, said carrier means including means for moving said magazine normal to said plane and a selector means for selecting a desired medium in alignment with said plane in accordance with a predetermined index;

transport means coupled to said base track and carrier means and including an elongated, flexible, planar looped belt slidably coupled to said track with its ends juxtaposed for engagement with the exposed, opposed edge of a selected medium for moving said medium along said plane; and reciprocal drive means couple to said transport means for driving said belt along said track in engagement with a selected medium for reciprocally moving said medium to and from said magazine to a preselected position.

3. A data handling system for planar data bearing media, comprising:

a support base means, including a plane-defining elongated track coupled to said base, said track being interrupted along its length;

a storage magazine adapted to store said media;

indexing carrier storage means coupled to said base means and track and adapted to receive and carry said storage magazine for storing a stack of said media in parallel, spaced relation, said magazine having openings at its opposite ends to expose pairs of opposed edges of said media, said openings each defining a plane, said plane being at right angles to said length of said track, said carrier means including means for moving said magazine normal to said plane and a selector means for selecting a desired medium in alignment with said plane in accordance with a predetermined index;

transport means coupled to said base track and carrier means and including an elongated, flexible, planar looped belt slidably coupled to said track with its ends juxtaposed for engagement with the exposed opposed edge of a selected medium for moving said medium along said plane, said belt having plurality apertures disposed along its length in spaced relation; and reciprocal drive means coupled to said transport means and said base means for driving said belt along said track in engagement with a selected medium reciprocally moving said medium from said magazine to a preselected position, said drive means including a pair of spaced, cylindrical drive rollers disposed within said loop and having circumferentially disposed sprockets for engaging said belt track through said apparatus.

4. A data handling system for planar data bearing media in a storage magazine adapted to store said media, comprising:

a support base means, including a plane-defining elongated track coupled to said base, said track being interrupted along its length;

indexing carrier storage means coupled to said base means and track and adapted to receive and carry said storage magazine for storing a stack of said media in parallel, spaced relation, said magazine having openings at its opposite ends to expose pairs of opposed edges of said media, said opening each defining a plane, said plane being at right angles to said length of said track, said carrier means including means for moving said magazine normal to said plane and a selector means for selecting a desired medium in alignment with said plane in accordance with a predetermined index;

transport means coupled to said base track and carrier means and including an elongated, flexible, planar looped belt slidably coupled to said track with its ends juxtaposed for engagement with the exposed, opposed edges of a selected medium for moving said medium along said plane; and reciprocal drive means coupled to said transport means for driving said belt along said track in engagement with a selected medium for reciprocally moving said medium to and from said magazine to a preselected position.

5. The data handling system of claim 2, wherein: said data is graphic information.

6. The data handling system of claim 2, wherein: said media are formed from photographic film.

7. The data handling system of claim 1, wherein:

said belt has a plurality of apertures disposed along its length in spaced relation; and said drive means includes a drive roller having a plurality of sprockets for engaging said belt through said apertures.

8. The data handling system of claim 1, wherein:

said drive means includes discriminator indexing means for sequentially moving said medium discrete distances along said track corresponding with a predetermined grouping of data.

9. The data handling system of claim 1, wherein:

said magazine has a pair of oppositely disposed parallel walls with a plurality of pairs of oppositely disposed congruent parallel grooves formed therein for supporting the opposite edges of said media in parallel spaced relation.

10. The data handling system of claim 2, wherein:

the thickness of said belt being no greater than the thickness of said medium.

11. The data handling system of claim 1, wherein:

said belt has a plurality of apertures disposed along its length in spaced relation;

said drive means includes a drive roller having a plurality of sprockets for engaging said belt through said apertures; and said drive means includes a discriminator indexing means for sequentially moving said medium.

12. A data handling system for planar data bearing media, comprising:

a support base means, including a plane-defining elongated track coupled to said base, said track being interrupted along its length for receiving a storage magazine containing said media;

indexing carrier storage means coupled to said base means and track and adapted to receive and carry a storage magazine for storing a stack of said media, said carrier means including means for moving said moving said magazine normal to said plane and a selector means for selecting a desired medium in alignment with said plane in accordance with a predetermined index;

a storage magazine adapted to store a stack of said media in parallel, spaced relation, said magazine being coupled to said carrier means and having openings at its opposite ends to expose pairs of opposed edges of said media;

transport means coupled to said base track and carrier means and including an elongated, flexible, planar, looped belt slidably coupled to said track with its ends juxtaposed for engagement with the exposed opposed edges of a selected medium for moving said medium along said plane; and reciprocal drive means coupled to said transport means for driving said belt along said track in engagement with a selected medium for reciprocally moving said medium from said magazine to a preselected position.

13. The data handling system of claim 1, wherein:

said selector means includes a rotatable, indexed, micrometer screw adjustment means for controlling the positioning of said magazine in accordance with the degree of rotation of said screw means.

14. The data handling system of claim 1, wherein:

said selector means includes a member extruding through an elongated clearance opening in said belt.

15. The data handling system of claim 1, wherein:

said magazine extends into said belt loop in engagement with said carrier means.

16. The data handling system of claim 1, wherein:

said carrier means includes a movable magazine support plate having a pair of spaced, resilient members extending therefrom engaging said magazine.

17. The data handling system of claim 1, wherein:

said magazine has the form of an elongated, rectangular tube with a plurality of pairs of oppositely disposed congruent parallel grooves formed in a pair of oppositely disposed parallel walls for supporting the media in said grooves in parallel, spaced relation.

References Cited in the file of this patent

UNITED STATES PATENTS 2,386,520 Watson et al. ------------ Oct. 9, 1945